US005958506A

United States Patent [19]

Kihara

[11] Patent Number: 5,958,506

[45] Date of Patent: Sep. 28, 1999

[54] METHOD OF RESTORING PAPER PAINTINGS AND CALLIGRAPHIC WORKS

[76] Inventor: Mitihiro Kihara, 10-1, 3-chome, Satakedai, Suita, Osaka 565, Japan

[21] Appl. No.: 09/006,169

[22] Filed: Jan. 13, 1998

[30] Foreign Application Priority Data

Jan. 13, 1997 [JP] Japan .................................... 9-003533
Jan. 13, 1997 [JP] Japan .................................... 9-003534

[51] Int. Cl.[6] ........................................................ B32B 35/00

[52] U.S. Cl. .......................... 427/140; 156/94; 264/36.11

[58] Field of Search .............................. 156/94; 427/140; 264/36.11, 36.22; 428/63

[56] References Cited

U.S. PATENT DOCUMENTS

| | | | |
|---|---|---|---|
| 3,096,194 | 7/1963 | Klimann | 427/140 |
| 3,265,515 | 8/1966 | Wilhelmsen | 427/140 |
| 4,234,621 | 11/1980 | Fieux | 427/140 |
| 4,305,773 | 12/1981 | Hendricks | 156/94 |
| 5,019,441 | 5/1991 | Zeliger | 156/94 |
| 5,217,752 | 6/1993 | Perez | 156/94 |

*Primary Examiner*—Daniel Stemmer
*Attorney, Agent, or Firm*—Armstrong, Westerman, Hattori, McLeLand & Naughton

[57] ABSTRACT

A method of restoring damaged portions of paper (Japanese and machine-made) paintings and calligraphic works, which does not require a high degree of skill, retains the original thickness of the work, improves durability after restoration and ensures neutralization of the work and simplification of any further restoration. A raw restoration liquid prepared from paper stock, water and an adhesive such as a liquid extract of Hibisci radix and optionally a colorant is placed in a vat. A target paper work to be restored is laid over a cloth or paper-making sheet which is laid over a filtering sheet-like member fitted into a paper-making frame. The paper-making frame is soaked in the raw restoration liquid so that the fibers contained in the raw restoration liquid are filled into the damaged portions of the paper work. The cloth or paper-making sheet is removed from the paper-making frame while the fibers are dried to the point of dampness. After further drying and removal from the paper-making frame a restored paper work is obtained.

16 Claims, 1 Drawing Sheet

METHOD OF RESTORING PAPER PAINTINGS AND CALLIGRAPHIC WORKS

BACKGROUND OF THE INVENTION

1. Field of the Invention

The present invention relates to a method of restoring cultural inheritances made of paper, and more particularly, to a method of restoring damaged portions of antique documents made of Japanese paper and machine-made paper, drawings, Japanese books, sutras, rolls, paintings, posters, etc. These works are hereinafter referred to as Japanese paper paintings and calligraphic works, or machine-made paper paintings and calligraphic works, or merely as paper paintings and calligraphic works, depending on the kinds of materials of which they are made.

Japanese paper, as used herein, means a hand-made paper, which is made from skin fibers of species such as *Broussonetia kazinoki, Edgeworthia papiryfera, Wikstroemia sikokania,* or the like. Machine-made paper, as used herein, means paper made from wood pulp, straw, cloth, or the like, or combinations thereof. Fibers of these materials are usually extracted from plants by mechanical or chemical methods.

2. Prior Art

The restoration of Japanese paper and machine-made paper antique documents and paintings can be classified into damage restoration, which is intended to restore these works in such a manner that the damaged portions thereof such as worm holes, cracks, breakage holes or holes due to aging, cannot be detected or the restored portions can be detected, and an artistic restoration, which is intended to interpolate the damaged portions after restoration or without restoring them. By interpolating, it is meant that the damage to writing and color on the work is repaired by supplying the necessary painting and drawing in the damaged portions.

In any of the above cases, the purpose of the restoration is to preserve for posterity the historical, artistic, religious and practical impressions and touches of precious paintings and calligraphic works left by our forebears. The need for restoring their damaged portions is extremely great, not only in Japan, but also in other countries in the world, whether the works were made of Japanese paper or machine-made paper.

Conventionally, as a general means for restoring paper paintings and calligraphic works which have been damaged into the depth of their basic materials, a method that occurs to everybody is one using a backing means, such method being frequently employed for restoring paper paintings and calligraphic works.

However, each paper painting and calligraphic work restored by the backing means becomes thicker when it is restored, since the restored portion would have a laminated structure of two sheets of paper, however thin the backing material is.

Further, due to the fact that the surface of the damaged portion becomes raised by an amount corresponding to the thickness of the paper work to be restored, the shape of the restored portion becomes different from the original shape of the work.

Accordingly, the restored work cannot have a thickness equal to its original thickness even when it is bound like a picture album and further, the restored work tends to be damaged on the raised portion at an early stage so that its durability and handling are not satisfactory.

Further, where the paintings and calligraphic works to be restored (hereinafter referred to as the target paper works) are made of acid paper, the oxidation and aging of the damaged portion cannot be prevented even when that portion is repaired and restored by the backing means, so that subsequent restoration is necessary again soon thereafter.

Thus, where a re-restoration and a subsequent re-restoration are made, the restored portion becomes thicker and thicker unless the old backing paper is peeled, which results in the necessity of peeling the backing paper at every restoration.

Moreover, in the case where the backing paper is peeled, due to the fact that when the target paper work is made of Japanese paper consisting of intertwined fibers, those fibers which project beard-like into the damaged portion are bonded to the backing paper, and also due to the fact that the target paper work made of machine-made paper is fragile because it consists of fibers that are not as much intertwined, it is extremely difficult to peel the backing paper from the target paper work without damaging it, unless this is done by a person with great experience and a high degree of skill.

In addition, the repetition of such restoration process is not preferable because it reduces the qualitative values of paper paintings and calligraphic works as cultural inheritances and especially, it also reduces the value of restoration by half since it cannot prevent color change taking place with the passage of time, which results from the degree of aging of paper paintings and calligraphic works.

In order to solve the above-mentioned problems relating to the restoration method using a backing means, a process of uniformly filling restoration fibers into the damaged portion is being used, although somewhat unsatisfactorily, for Japanese paper paintings and calligraphic works. For machine-made paper paintings and calligraphic works, restoration by the backing means is now used conventionally.

The filling process used for restoration of Japanese paper paintings and calligraphic works is a method in which the target paper work is held stationary on a filtering sheet-like member, fibers are filled into the damaged portion of the target paper work by conventional paper hand-making technique so that the filled fibers are fitted to the damaged portion, and after dewatering, the target paper work is removed from the filtering sheet-like member for drying, and after lightly pressing it, the fiber-filled portion is cut to the original size of the damaged portion. Since the strength of the restored portion cannot be provided by the filling of the fibers, the restored portion is further backed for reinforcement.

However, when the portion restored by the above-mentioned filling means is backed, although it is possible to avoid having the damaged portion being raised by the thickness of the paper, which has been the problem involved in the restoration process merely using the backing paper, an increase in the thickness of the damaged portion due to backing cannot be avoided, so that it is not possible to eliminate various problems resulting from the use of the above-mentioned backing means.

Further, where the target paper work on the filtering sheet-like member is removed at the stage after dewatering, the target paper work frequently breaks even if it is deliberately and carefully handled, resulting in a reduction of the precious value thereof. In order to prevent such drawback, an extremely high level of skill is required and a quick restoration operation cannot be expected, resulting in an increase of the restoration costs.

Further, there have arisen a lot of problems in that the color change with time of the restored target printing or calligraphic work due to oxidation, degree of aging and the like cannot be prevented, and at the same time, the durability of the work after restoration cannot be maintained because of an acceleration of the weakening of the work due to oxidation, so that not only sufficient care is required for handling and storage of the restored work, but also another restoration soon becomes necessary.

SUMMARY OF THE INVENTION

The present invention has been made to solve the above-mentioned conventional problems, and an object of the present invention is to provide a method of restoring paper paintings and calligraphic works, which method enables a target paper work to be restored quickly and securely without the necessity of using a highly-skilled technique, restores the paper work to its original thickness and smoothness before restoration, improves the durability thereof after restoration, allows the performance of a re-restoration without requiring any skilled technique, and can prevent the color change with time and weakening due to the oxidation and aging of the work.

Method of restoring Japanese paper paintings and calligraphic works

This method is performed according to the following procedures:

1. a first restoration preparation process in which either a Japanese paper stock consisting of skin fibers of *Broussonetia kazinoki sieb, Edgeworthia papyrifera sieb, Wikstroemia sikokiana* or the like, or a Japanese waste paper stock, or both, is/are dissolved in water having a pH value of about 6–8 so as to be ready for paper-making by hand, and the resulting blend is mixed with a required amount of an adhesive such as a viscous liquid extract of Hibisci radix to prepare a raw restoration liquid which is placed in a vat;
2. a second restoration preparation process in which (1) a water-dipped filtering sheet-like member having a unidirectional flexibility and a filtering function is fitted into a paper-making frame; (2) a cloth such as drawing silk, or a paper-making sheet having the same flexibility and water-permeability as the cloth, is laid over the filtering sheet-like member and dampened, or the paper-making sheet is soaked in water and then laid over the filtering sheet-like member without forming cockles, or the soaked paper-making sheet is laid over the filtering sheet-like member and then made cockleless; and (3) a target paper work to be restored is laid over the cloth or paper-making sheet, dampened and made cockleless by using a brush or a spray means; and
3. a restoration finishing process in which (1) a paper-making operation is performed by soaking the paper-making frame (prepared in the above-mentioned second restoration preparation process) into the raw restoration liquid in the vat prepared in the above-mentioned first restoration preparation process, so that the restoration fibers included in the raw restoration liquid are filled flat into the damaged portion of the target paper work to be restored; (2) after the paper-making operation, the paper-making frame is taken out for dewatering and drying, the filtering sheet-like member to which the cloth or paper-making sheet and the target paper work are adhered closely in a laminated state is removed from the paper-making frame while the filled fibers are damp-dried (i.e., dried just to the point of dampness) and a pressure paper sheet is laid over the target paper work to make the latter cockleless; (3) only the filtering sheet-like member is removed and the lamination of the cloth or paper-making sheet, the pressure paper sheet and the target paper work sandwiched between the former two is applied to a smooth surface for drying; and (4) both of the cloth or paper-making sheet and the pressure paper sheet are removed from the lamination to thereby complete the restoration of the target paper work.

Method of restoring machine-made paper paintings and calligraphic works

This method is performed according to the following procedures:

1. a first restoration preparation process in which a Japanese paper stock consisting of *Broussonetia kazinoki sieb, Edgeworthia papyrifera sieb* or the like and/or a machine-made paper stock consisting of wood pulp or chemical pulp and the like, or a combination of the above-mentioned paper stock and an auxiliary stock consisting of waste paper pulp, is blended with water having a pH value of about 6–8 so as to become ready for paper-making by hand, and the resulting blend is mixed with a required amount of an adhesive such as a viscous liquid extract of Hibisci radix to prepare a raw restoration liquid which is placed in a vat;
2. a second restoration preparation process in which (1) a water-dipped filtering sheet-like member having unidirectional flexibility and a filtering function is fitted into a paper-making frame; (2) a cloth such as drawing silk, or a paper-making sheet having the same flexibility and water-permeability as the cloth, is laid over the filtering sheet-like member and dampened, or the paper-making sheet is soaked in water and laid over the filtering sheet-like member without forming cockles, or the soaked paper-making sheet is laid over the filtering sheet-like member and then made cockleless; and (3) a target paper work to be restored is laid over the cloth or paper-making sheet in such a manner that in the case where the work has one surface printed or bearing handwriting, the printed or handwritten surface of the target paper work is held opposite to the cloth or paper-making sheet and the target paper work is dampened and made cockleless by using a brush or spray means; and
3. a restoration finishing process in which (1) a paper-making operation is performed by soaking the paper-making frame (prepared in the above-mentioned second restoration preparation process) into the raw restoration liquid in the vat prepared in the above-mentioned first restoration preparation process, so that the restoration fibers included in the raw restoration liquid are filled flat into the damaged portion of the target paper work to be restored; (2) after the paper-making operation, the paper-making frame is taken out for dewatering and drying, the filtering sheet-like member to which the cloth or paper-making sheet and the target paper work are adhered closely in a laminated state is removed from the paper-making frame while the paper-making frame is damp-dried and a pressure paper sheet is laid over the target paper work to make the latter cockleless; (3) only the filtering sheet-like member is removed and the lamination of the cloth or paper-making sheet, the pressure paper sheet and the target paper work sandwiched between the former two is applied to a flat surface and spread flat for drying; (4) either the paper-making sheet or the pressure paper sheet is removed from the above-mentioned dried lamination; (5) the whole of the remaining lamination is dampened and an adhesive such as a substantially neutral mounting paste or a viscous liquid extract of Hibisci radix is coated locally over the boundary of the damaged portion of the target paper work; (6) either the cloth/paper-making sheet or the pressure paper sheet removed from the lamination is laid over the target paper work for re-dampening and both surfaces of the new lamination are made cockleless for final finishing; and (7) the lamination is again applied to the flat surface and spread flat for drying and the cloth or paper-making sheet or the pressure paper sheet is removed from the lamination including the target paper work.

It should be noted that in the above-mentioned first restoration preparation process for Japanese paper paintings and calligraphic works, distilled water is used as the water having a pH value of about 6–8 and a coloring agent corresponding to the color of the target paper work to be restored is added to the raw restoration liquid, so that the resistance against weakening of the target paper work due to oxidation and aging resulting from the neutralization of the target paper work and the prevention control of color change over time are improved.

Further, in the above methods, where both of the cloth/paper-making sheet and the pressure paper sheet are removed from the dried lamination, a peeling damage preventive step may be used to improve the flexibility and peelability of the target Japanese or machine-made paper work, by very slightly and locally dampening the damaged portion and its vicinity in the target paper work, depending on the type of the paper work, using a spray means or the like.

It is also possible to ensure the strength of the target paper work in the following manner. Before both of the cloth/paper-making sheet and the pressure paper sheet are removed from the dried lamination, the entire lamination is dampened, the neutral adhesive such as a viscous liquid extract of Hibisci radix, which neither solidifies nor impairs the flexibility of paper, is coated only on the boundary of the target paper work and the hand-made Japanese paper continuously formed therearound, or also coated on the portion including the damaged portion of the target paper work by using a brush, and after drying, both of the cloth/paper-making sheet and the pressure paper sheet are removed, so that a portion of the hand-made Japanese paper formed around the damaged portion can be used as a binding margin.

Where a target paper work having a picture or calligraphic display only on the upper surface thereof is laid over the cloth or paper-making sheet, it is preferable that the surface of the target paper work be held closely adhered to the cloth or paper-making sheet so that the overlay of the restoration fiber material from the raw restoration liquid, which overlay is generated at the portion surrounding the damaged portion or the contour thereof, is present not on the front surface but on the rear surface of the target paper work, thereby preventing the presence of even a slight degree of such overlay on the picture or calligram displayed on the damaged portion of the target paper work.

DETAILED DESCRIPTION OF THE INVENTION

Figure 1:
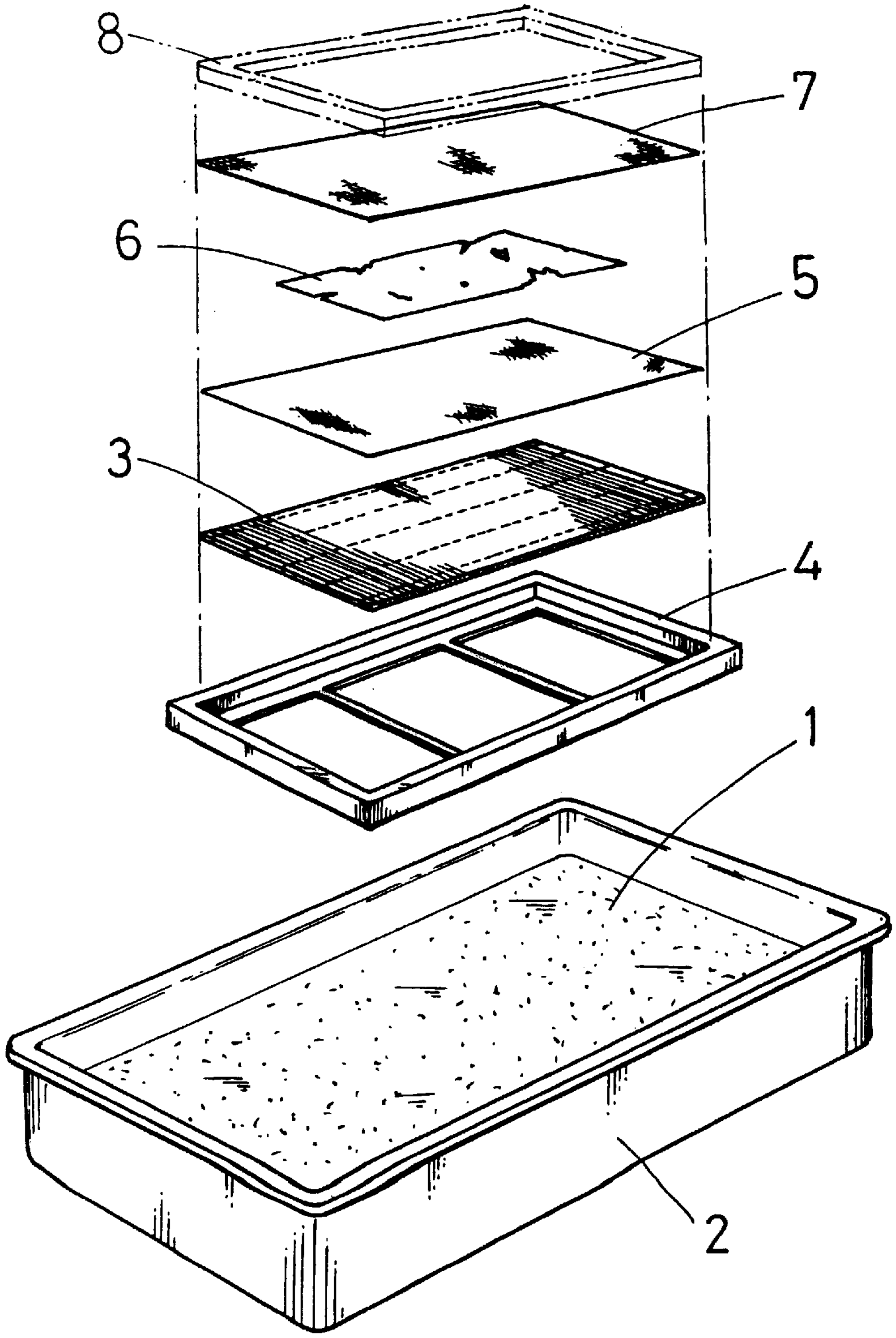
FIG. 1 is a schematic perspective view which illustrates tools used for performing a method of restoring Japanese or machine-made paper paintings and calligraphic works according to the present invention, and also illustrates one example of a damaged condition of a target paper work to be restored.

Preferred embodiments of a method of restoring Japanese and machine-made paper paintings and calligraphic works will now be described.

1. A method of restoring Japanese paper paintings and calligraphic works

A case will be described wherein the target paper work is an antique document of substantially B4 size which is brown-colored and slightly weakened due to oxidation, which has characters written or printed on one of the surfaces thereof, and which has worm holes and age-damaged portions.

First, 380 g of a restoration fiber material consisting of a (5:1) mixture of a Japanese paper stock produced from *Broussonetia kazinoki sieb* and/or *Edgeworthia papyrifera sieb* and an auxiliary stock consisting of waste Japanese paper is blended with 10 l of distilled water. A raw restoration liquid 1 is obtained by mixing the resulting blend with 0.6 l of viscous liquid extract of Hibisci radix as an adhesive and 40 l of distilled water. A vat 2 of 100 cm (width)×60 cm (height)×15 cm (depth) is filled to about 60–70% capacity with the raw restoration liquid and agitated. For convenience of description, this operation is referred to as a first restoration preparation process.

Next, as a second restoration preparation process, a filtering sheet-like member (hereinafter referred to as a drain board 3) comprising a screen formed by binding a number of reed stems or fine bamboo or wooden strips with threads and having unidirectional flexibility and a filtering function is fitted into a paper-making frame 4 after dampening, drawing silk (hereinafter referred to as a gauze 5) which is a paper-making sheet obtained by intertwining silk yarns is placed on the drain board 3 and dampened by a spray means (note: for improving efficiency, the gauze 5 may be placed on the drain board 3 after it is soaked in water). Then the gauze 5 is smoothed out lightly by a brush to thereby prevent it from getting cockled, a target paper work 6 to be restored is placed over the gauze 5 with the character-displaying surface of the target paper work 6 facing the upper surface of the gauze 5 and then dampened by a wet brush or a spray means, thereby making the work cockleless.

Then, the paper-making frame 4 is soaked into the raw restoration liquid 1 in the vat 2 after uniformly agitating the liquid 1, then shaken as in conventional paper hand-making, so that the worm holes and holes due to breakage or aging are filled in with the restoration fibers to a visually gauged thickness substantially equal to the thickness of the target paper work 6 (i.e., to be level with the surface of the target paper work 6). To that effect, the filled-in paper stock may need to be flattened so that the paper stock does not protrude over the surface of the paper. After that, the paper-making frame 4 is removed from the vat 2 and held horizontal for dewatering, and after it is damp-dried, the paper-making frame 4 is removed from the drain board 3 to which the gauze 5 and the target paper work 6 are closely adhered in a laminated state. Then rayon paper 7 as a pressure paper sheet is placed on the target paper work 6 and made cockleless while it is dampened with a brush or the like.

After the above operation, only the drain board 3 is removed and a lamination of the gauze 5, the rayon paper 7 and the target paper work 6 sandwiched between the former two is applied to a fulling board and dried in a drying chamber (at a room temperature of about 30° C.). When the lamination is dried, the gauze 5 and the rayon plate 7 are removed. A fulling board as used herein is a flat board which is used to prevent the paper lamination from forming a crease, slack or bend.

In the above case, although not always necessary, the hand-made Japanese paper portion continuous with the target paper work 6 and the restored damaged portion may be slightly dampened by a spray means, depending on the quality of target paper work 6, so that the flexibility and peelability of the work 6 are enhanced, thereby preventing the breakage of the work 6 when the gauze 6 and the rayon paper 7 are peeled therefrom.

The dampening of the target paper work 6 at the time of removing the gauze 5 and the rayon paper 7 may be performed together with the reinforcement of the damaged portion and its vicinity in the target paper work 6 by the coating of the adhesive consisting of the mounting paste or the viscous liquid extract of Hibisci radix. The dampening may also be performed in a state in which the removed rayon paper 7 (or a separately prepared one) is placed again over the work 6, but in that case, it is necessary to remove the rayon paper 7 until the adhesive is dried.

It should be noted that although in the above-described embodiment the raw restoration liquid 1 was obtained in such a manner that 380 g of the restoration fiber material consisting of a (5:1) mixture of the Japanese paper stock produced from *Broussonetia kazinoki sieb* and/or *Edgeworthia papyrifera sieb* and the auxiliary stock of waste Japanese paper was blended with 10 l of distilled water, and a mixture of 0.6 l of a viscous liquid extract of Hibisci radix as an adhesive and 40 l of distilled water is added to the blended restoration fiber material, the present invention is not always limited thereto because the mixing materials and ratios differ depending on the quality, thickness, degree of damage, and other characteristics of the target paper work 6, and the restoration operation on the target paper work 6 is performed according to the pre-established mixing ratios of various kinds of qualities of the target paper works restored in the past.

Further, it should be noted that although the raw restoration liquid 1 in the above-described embodiment has been described to consist of a mixture of the Japanese paper stock, the auxiliary stock, the viscous liquid extract of Hibisci radix and distilled water in prescribed ratios, the combination and mixing ratios of these materials are optional.

2. A method of restoring machine-made paper paintings and calligraphic works

One embodiment of the method of restoring machine-made paper paintings and calligraphic works according to the present invention will now be described by referring to FIG. 1, especially when the target paper work to be restored is a poster of 30×40 cm with a thickness to 0.3 mm having a design displayed on one surface thereof and worm holes, breakage holes due to aging and weakening, and weakened portions.

First, 1060 g of restoration fibers consisting of a (3:1) mixture of a machine-made paper pulp stock and a Japanese paper stock produced from *Edgeworthia papyrifera sieb* and/or *Broussonetia kazinoki sieb* are blended with 120 l of distilled water. To the resulting blend 30 l of distilled water is added and the resulting material is kneaded. A raw restoration liquid 1 is obtained by adding 1.5 l of viscous liquid extract of Hibisci radix (as an adhesive) to the kneaded resulting material. A vat 2 of 120 cm (width)×80 cm (height)×20 cm (depth) was filled to about 60–70% capacity with the raw restoration liquid and agitated. For the sake of convenience of description, this operation is referred to as a first restoration preparation process.

Next, the whole of the filtering sheet-like member (i.e., the drain board 3) is fitted into the paper-making frame 4 after dampening, the gauze 5 is placed over the drain board 3 and dampened by using a spray means (note: for improving efficiency, the gauze 5 may be placed on the drain board 3 after it is soaked in water). The gauze 5 is then lightly smoothed out by a brush lest is should get cockled, and a target paper work 6 to be restored is placed over the gauze 5 with the character-displaying surface of the work 6 facing the upper surface of the gauze 5 and then dampened by a wet brush or spray means, thereby making the target paper work cockleless.

Then, the paper-making frame 4 is soaked into the raw restoration liquid 1 in the vat 2 after uniformly agitating the liquid 1, and shaken by hand as in the conventional paper hand-making method so that the worm holes due to breakage or aging are filled in with the restoration fibers to a visual thickness substantially equal to the thickness of the target paper work 6 (i.e., to be flat and level with the surface of the target paper work 6). After that, the paper-making frame 4 is removed from the vat 2 and held horizontal for dewatering and after it is damp-dried, the paper-making frame 4 is removed from the drain board 3 to which the gauze 5 and the target paper work 6 are closely adhered in a laminated state. Then the rayon paper 7 as a pressure paper sheet is placed over the target paper work 6 and made cockleless while it is dampened with a brush or the like.

Incidentally, where it is necessary to restore any peeled or weakened portion of the surface of the target paper work, the portion may be restored simultaneously with the restoration of other worm holes, cracks and breakages, by making small holes through that portion to make it water permeable. After restoration, no holes are visible because the paper stock fills up the holes.

After removing the gauze 5 and the rayon paper 7, the whole target paper work is dampened by a spray means, the mounting paste or the adhesive such as a viscous liquid extract of Hibisci radix is coated on the damaged portion and its vicinity in the target paper work, the rayon paper 7 removed in the previous process (alternatively, a separately prepared rayon paper may be used) is placed again on the target paper work 6 so as to be dampened in its entirety. After that, the surfaces of both the rayon paper 7 and the target paper work 6 are smoothed down by a brush in sequence, so that the surfaces become cockleless and the strength of fiber-twining at the boundary of the damaged portion of the target paper work is increased, thereby improving the durability of the work after restoration.

Next, the target paper work 6 sandwiched between the drawing silk 5 and the rayon paper 7 is applied to a fulling plate and spread flat without forming cockles, and after drying in a drying chamber (at a temperature of about 30° C.), both the drawing silk 5 and the rayon paper 7 are removed.

In the above case, although not always necessary, the hand-made Japanese paper portion is continuous with the target paper work 6, and the restored damaged portion may be slightly dampened by a spray means according to the type of target paper work 6 so that the flexibility and peelability of the work 6 are enhanced, thereby preventing the breakage of the work 6 when the gauze 5 and the rayon paper 7 are peeled therefrom.

The poster restored by the above-mentioned restoration method can be further restored artistically by filling in deficiencies with respect to characters and colors displayed thereon. Thus, by restoring precious paper paintings and calligraphic works left by our forebears to as close to their original forms as possible, it is possible to recover and leave to posterity the historical, artistic, religious and practical impressions and touches of these works.

Further, in the method of restoring machine-made paper paintings and calligraphic works according to the above-described embodiment, 1060 g of restoration fiber material which is a (3:1) mixture of the machine-made paper pulp stock and Japanese paper stock consisting of *Edgeworthia papyrifera sieb* and/or *Broussonetia kazinoki sieb* are blended with 120 l of distilled water, the resulting blend of restoration fiber material is kneaded with the addition of 30 l of distilled water, and the kneaded material is mixed with 1.5 l of the viscous liquid extract of Hibisci radix as an adhesive to obtain the raw restoration liquid 1. Such arrangement was made when the target paper work 6 is the above-mentioned poster and the mixing materials and ratios thereof differ depending on the type and thickness of the target paper work 6, so that the restoration operation on the work 6 is performed in accordance with the preset mixing ratios of various kinds of types of target paper works restored in the past.

Further, it has been explained that the raw restoration liquid 1 used in the above-described method has been prepared by mixing at a prescribed ratio the stock containing the machine-made paper stock and the Japanese paper stock with the adhesive consisting of the viscous liquid of Hibisci radix in distilled water, but the combinations and ratios of the distilled water, Japanese paper stock, machine-made paper stock, auxiliary stock and adhesive may be optionally determined.

It should be noted that the kind of adhesive and the mixing ratio thereof used in the methods of restoring Japanese and machine-made paper paintings and calligraphic works are not specified, and so the use of an adhesive having no adverse effect on the target paper work 6 or a liquid having adhesive properties such as a viscous liquid extract from the bark of *Hydrangea paniculata,* a viscous aqueous solution of polyethylene oxide, etc. besides the viscous liquid extract of Hibisci radix, in suitable ratios is also included in the methods.

Moreover, in each of the above-described embodiments, the use of the drain board 3 as the filtering sheet-like member, the drawing silk as the paper-making sheet 5 and the rayon paper 7 as the pressure paper sheet has been described, but the present invention is not limited thereto, so that it goes without saying that a fine metal or synthetic resin netting having the same strength and flexibility can be used as the drain board 3, a smooth plain or twill weave cloth having the same fiber-making function and flexibility can be used as the drawing silk 5, and a cloth (like the drawing silk 5) which does not discolor and which has the pliability and strength required at the time of peeling by water absorption can be used as the rayon paper 7.

With respect to the running or leaching taking place at the contour of a character or colored portion displayed on the target paper work 6 when the target paper work is soaked in water, such running or leaching may be controlled by use of a commercial leaching preventive spray means or alum.

In addition, in view of the fact that the amount of the restoration fibers included in the raw restoration liquid 1 decreases as the number of paper-making operation increases, in the case where the target paper work is an antique document of B4 size, it is of course necessary to maintain the amount of the restoration fibers and the density of the adhesive by properly adding a supplemental amount of the restoration liquid (about 1 l) at the stage when 4–6 pages of the document have been restored, and in the case where the target paper work is a poster, it is necessary to secure the amount of the restoration fibers and the density of the adhesive by properly supplementing three times that amount of the restoration liquid (about 3 l).

Further, one or a plurality of inner frames 8, each serving as an inside stop meeting the size of the target paper work, may be placed into the paper-making frame 1 to prevent a hand-made paper portion from being formed around the target paper work, thereby eliminating the necessity of removing that portion which would otherwise be formed.

Effects of the method of restoring Japanese paper paintings and calligraphic works In the method of restoring Japanese paper paintings and calligraphic works according to the present invention, either the Japanese paper stock consisting of skin fibers of *Broussonetia kazinoki sieb, Edgeworthia papyrifera sieb, Wikstroemia sikokiana* or the waste Japanese paper stock, or both, is/are blended in water having a pH value of about 6–8 so as to be ready for papermaking. The paper-making sheet is laid over the dampened filtering sheet-like member and is fitted into the paper-making frame, and the target paper work to be restored is laid over the filtering sheetlike member to form a lamination. The paper-making frame is placed into the vat containing raw restoration liquid mixed with a required amount of adhesive such as the viscous liquid extract of Hibisci radix to perform a paper-making operation. As a result, the damaged portion of the target paper work including worm holes, cracks, breakage holes, and holes due to aging, allows the raw restoration liquid to pass therethrough so that the fibers contained in the liquid fill up the damaged portion through the paper-making sheet, and at the same time, slightly overlay the portion not requiring restoration at the area surrounding the damaged portion and the contour of the target paper work while the liquid flows down along the remaining portion, so that the damaged portion of the target paper work can be restored smoothly without changing the thickness of the target paper work.

Further, the fibers which have filled in the damaged portion impart boundary connecting strength to the filled-in damaged portion by the action of the adhesive mixed in the raw restoration liquid, the intertwining action of the fibers, and the beard-like overlay around the damaged portion, so that the damaged portion is restored without changing the thickness of the target paper work.

Thus, after completion of the paper-making operation, the paper-making frame is removed from the vat for dewatering, and while the paper-making frame is damp-dried, the target paper work is removed from the paper-making frame together with the filtering sheet-like member, the pressure paper sheet is laid over the target paper work and is smoothly pressed with a brush, so that the damaged portion is smoothly and completely filled up without the formation of gaps around the damaged portion.

Further, throughout these processes to the final finishing process, either the paper-making sheet or the pressure paper sheet is removed to dampen the remaining lamination in its entirety, and the adhesive such as the viscous liquid extract of Hibisci radix is coated on the damaged portion of the target paper work, thereby further ensuring the strength of the boundary of the damaged portion.

In addition, the target paper work together with the filtering sheet-like member is removed from the paper-making frame for various kinds of processes to continue to be performed, and finally, the paper-making sheet and the pressure paper sheet are removed, whereby the possibility of damaging the target paper work after restoration, such as breakage which occurs when only the target paper work is removed immediately after dewatering the paper-making frame, can be eliminated.

Further, the method of the present invention is economical since the paper-making frame can be used for another restoration operation after the target paper work is removed therefrom together with the filtering sheet-like member.

Moreover, when both the paper-making sheet and the pressure paper sheet are removed from the dried lamination, the damaged portion of the target paper work and the contour of the Japanese paper portion continuous with the former are slightly and locally dampened, and when the peeling damage preventive step to improve the flexibility is used, even when the target paper work is weak it is quite rarely damaged.

Effects of the method of restoring machine-made paper paintings and calligraphic works In the method of restoring machine-made paper paintings and calligraphic works according to the present invention, the Japanese paper stock consisting of *Broussonetia kazinoki sieb, Edgeworthia papyrifera sieb* and/or *Wikstroemia sikokiana* and/or the machine-made paper stock consisting of wood pulp or chemical pulp or the like and the auxiliary stock of waste pulp is blended in water having a pH value of 6–8 so as to be ready for paper-making. The paper-making sheet is laid over the dampened filtering sheet-like member which is fitted into the paper-making frame, and the target paper work to be restored is laid over the filtering sheet-like member to form a lamination. The paper-making frame is placed into the vat containing the raw restoration liquid mixed with the adhesive such as the viscous liquid extract of Hibisci radix to perform a paper-making operation. The damaged portion of the target paper work, which contains worm holes, breakage holes, holes due to weakening and weakened water-permeable portions, allows the raw restoration liquid to pass therethrough, so that the fibers contained in the liquid fill up the damaged portion through the paper-making sheet, while the portion not requiring restoration allows the fibers to flow down therealong without standing, so that portion absorbs only a small amount of neutral pH water to become neutralized, thus preventing the target paper portion after restoration from becoming weakened due to oxidation, thereby improving its durability, and the target paper work can be smoothly restored without impairing its surface or surfaces (printed on one side or both sides) and without changing its thickness.

Further, the fibers which have filled in the damaged portion of the target paper work are held in a temporary linked state by the action of the adhesive mixed in the raw restoration liquid and by the intertwining action with the short nappy fibers formed around the damaged portion.

Still further, after the completion of the paper-making operation, the paper-making frame is removed from the vat for dewatering, and while the frame is in its damp-dried state, the target paper work is removed together with the filtering sheet-like member. Then, the pressure paper sheet is laid over the target paper work, pressed and smoothed by a brush or the like. Thus, by such process, the damaged portion of the target paper work is smoothed and filled up completely, so as to be brought to an excellent restored state.

In addition, throughout the operation from the completion of the paper-making operation to the final cockleless finish, either the paper-making sheet or the pressure paper sheet is removed to dampen the lamination in its entirety, and a mounting paste or an adhesive such as a viscous liquid extract of Hibisci radix is coated locally on the damaged portion of the target paper work to be restored, so that the intertwining of the fibers at the boundary of the damaged portion can be reinforced and the durability of the target paper work after restoration can be improved.

Further, since the target paper work is removed from the paper-making frame together with the filtering sheet-like member for continuing with various other kinds of operations, and at the final stage, the paper-making sheet and the pressure paper sheet are removed from the target paper work, the target paper work can be handled with ease and it is possible to avoid damages of the machine-made paper paintings and calligraphic works after restoration, such as breakages occurring when only the target paper work is removed for drying immediately after it is dewatered.

Still further, since the paper-making frame can be used for another restoration operation from the stage at which the target paper work is taken out together with the filtering sheet-like member, the cycle of using the paper-making frame can be shortened to make effective use of the paper-making frames which are quite small in number, and the restoration operation can be performed securely, quickly, and without requiring any skilled technique, thereby reducing the restoration cost.

Moreover, the target paper work having its damaged portion restored can be further restored artistically with ease by filling in any deficiencies with respect to writings and colors on the work, so that it is possible to leave to posterity for many years to come the historical, artistic, religious and practical impressions and touches of precious paper paintings and calligraphic works such as drawings, pictures, posters, photographs, etc., left by our forebears.

Common effects of the methods of restoring Japanese paper and machine-made paper paintings and calligraphic works In the first restoration preparing process, distilled water is used as the water having a pH value of about 6–8, the coloring agent corresponding to the color of the target paper work is added to the raw restoration liquid to neutralize the target paper work after restoration, so that it is possible to enhance the resistance of the target paper work against deterioration due to oxidation, aging, etc., to prevent color change with time of the target paper work, and to minimize the difference in color between the restored portion and the remaining portion of the target paper work.

Accordingly, this method of restoring paper paintings and calligraphic works is extremely useful because the method makes it possible to restore the target paper work quickly, securely, and at low cost without requiring any high level of skill, to prevent color change due to time, and the weakening of the target paper work (due to oxidation and aging) by neutralizing the paper paintings and calligraphic works, and to meet the extremely great need for the restoration of the works.

What is claimed is:

1. A method of restoring Japanese paper paintings and calligraphic works, which method comprises in sequence;

a first restoration preparation process in which either a Japanese paper stock consisting of skin fibers of at least one of *Broussonetia kazinoki sieb, Edgeworthia papyrifera sieb* or *Wikstroemia sikokiana,* or a waste Japanese paper stock, or a combination of said Japanese paper stock and waste Japanese paper stock is blended in water having a pH value of about 6–8, and the resulting blend is mixed with an adhesive to prepare a raw restoration liquid;

a second restoration preparation process in which (1) a water-dipped filtering sheet member having a unidirectional flexibility and filtering function is fitted into a paper-making frame; (2) a cloth or a flexible and water-permeable paper-making sheet is laid over the filtering sheet member and dampened, or the cloth or paper-making sheet is soaked in water and then laid over the filtering sheet member without forming cockles, or cloth or paper-making sheet is soaked in water and laid over the filtering sheet member and then made cockleless; and (3) a target paper work to be restored is laid over the cloth or paper-making sheet, dampened and made cockleless by using a brush or a spray means; and a restoration finishing process in which (1) a paper-making operation is performed by soaking the paper-making frame prepared in said second restoration preparation process into the raw restoration liquid in the vat prepared in said first restoration preparation process so that fibers contained in said raw restoration liquid are filled into a damaged portion of the target paper work to be restored; (2) after the paper-making operation, the paper-making frame is removed for dewatering and drying, the filtering sheet member to which the cloth or paper-making sheet and the target paper work are closely adhered in a laminated state is removed from the paper-making frame while the paper-making frame is damp-dried and a pressure paper sheet is laid over the target paper work to make the latter cockleless, (3) only the filtering sheet member is removed and a lamination of the cloth or paper-making sheet, the pressure paper sheet and the target paper work sandwiched between the former two is applied to a smooth surface for drying; and (4) both the cloth or paper-making sheet and the pressure paper sheet are removed from said lamination to thereby complete the restoration of the target paper work.

2. A method of restoring Japanese paper paintings and calligraphic works as in claim 1, wherein when both the cloth or papermaking sheet and the pressure paper sheet are removed from said dried lamination, a peeling damage preventive measure is taken to improve the flexibility and peelability of the target Japanese paper work by very slightly and locally dampening the damaged portion and its vicinity in the target Japanese paper work as needed depending on the quality of the target Japanese paper work.

3. A method of restoring machine-made paper paintings and calligraphic works, which comprises:

a first restoration preparation process in which a machine-made paper stock consisting of a Japanese paper stock produced from at least one of *Broussonetia kazinoki sieb, Edgeworthia papyrifera sieb* or wood pulp or a combination of said machine-made paper stock and an auxiliary stock consisting of waste paper pulp is blended in water having a pH value of about 6–8, and the resulting blend is mixed with an adhesive to prepare a raw restoration liquid which is placed in a vat;

a second restoration preparation process in which (1) a water-dipped filtering sheet member having a unidirectional flexibility and a filtering function is fitted into a paper-making frame; (2) a cloth or a flexible and water-permeable paper-making sheet is laid over the filtering sheet member without forming cockles, or laid over the filtering sheet member and then made cockleless, and (3) a target paper work to be restored is laid over the cloth or paper-making sheet in such a manner that when the target paper work has one surface painted or handwritten, the printed or handwritten surface is placed facing the cloth or paper-making sheet, and the target paper work is dampened and made cockleless by using a brush or spray means; and a restoration finishing process in which (1) a paper-making operation is performed by soaking the paper-making frame prepared in said second restoration preparation process into the raw restoration liquid in the vat prepared in said first restoration preparation process, so that the restoration fibers included in the raw restoration liquid are filled into a damaged portion of the target paper work to be restored; (2) after the paper-making operation, the paper-making frame is removed for dewatering and drying, the filtering sheet member to which the cloth or paper-making sheet and the target paper work are adhered closely in a laminated state is removed from the paper-making frame while it is damp-dried and a pressure paper sheet is laid over the target paper work to make the latter cockleless; (3) only the filtering sheet member is removed and a lamination of the cloth or paper-making sheet, the pressure paper sheet and the target paper work sandwiched between the former two is applied to a flat surface and spread flat for drying, (4) either the cloth or paper-making sheet or the pressure paper sheet is removed from said dried lamination; (5) the whole remaining lamination is dampened and an adhesive is coated locally over the boundary of the damaged portion of the target paper work for re-dampening and both surfaces of the lamination are made flat and cockleless for final finishing; and (7) the lamination is applied to the flat surface and spread flat again for drying, after which the cloth or paper-making sheet and the pressure paper sheet are removed from the lamination including said target paper work.

4. A method of restoring paper paintings and calligraphic works as in claim 1, wherein said water having a pH value of about 6–8 used in said first restoration preparation process is distilled water and a coloring agent corresponding to the color of said target paper work to be restored is added to said raw restoration liquid.

5. A method of restoring paper paintings and calligraphic works as in claim 2, wherein said water having a pH value of about 6–8 used in said first restoration preparation process is distilled water and a coloring agent corresponding to the color of said target paper work to be restored is added to said raw restoration liquid.

6. A method of restoring paper paintings and calligraphic works as in claim 3, wherein said water having a pH value of about 6–8 used in said first restoration preparation process is distilled water and a coloring agent corresponding to the color of said target paper work to be restored is added to said raw restoration liquid.

7. A method of restoring paper paintings and calligraphic works as in claim 1, wherein both said cloth or paper-making sheet and said pressure paper sheet are removed from said dried lamination after the whole lamination is dampened, an adhesive is coated only on the boundary between said target paper work and a hand-made Japanese paper portion formed continuous with the former, or an adhesive is coated also on the damaged portion of said target paper work by using a brush, and the coated lamination is dried.

8. A method of restoring paper paintings and calligraphic works as in claim 2, wherein both said cloth or paper-making sheet and said pressure paper sheet are removed from said dried lamination after the whole lamination is dampened, an adhesive is coated only on the boundary between said target paper work and a hand-made Japanese paper portion formed continuous with the former, or an adhesive is coated also on the damaged portion of said target paper work by using a brush, and the coated lamination is dried.

9. A method of restoring paper paintings and calligraphic works as in claim 3, wherein both said cloth or paper-making sheet and said pressure paper sheet are removed from said dried lamination after the whole lamination is dampened, an adhesive is coated only on the boundary between said target paper work and a hand-made Japanese paper portion formed continuous with the former, or an adhesive is coated also on the damaged portion of said target paper work by using a brush, and the coated lamination is dried.

10. A method of restoring paper paintings and calligraphic works as in claim 1, wherein said cloth or paper-making sheet is a cloth and said cloth is drawing silk.

11. A method of restoring paper paintings and calligraphic works as in claim 2, wherein said cloth or paper-making sheet is a cloth and said cloth is drawing silk.

12. A method of restoring paper paintings and calligraphic works as in claim 3, wherein said cloth or paper-making sheet is a cloth and said cloth is drawing silk.

13. A method of restoring paper paintings and calligraphic works as in claim 1, wherein said adhesive is a viscous liquid extract of Hibisci radix.

14. A method of restoring paper paintings and calligraphic works as in claim 2, wherein said adhesive is a viscous liquid extract of Hibisci radix.

15. A method of restoring paper paintings and calligraphic works as in claim 3, wherein said adhesive is a viscous liquid extract of Hibisci radix.

16. A method of restoring Japanese paper paintings and calligraphic works as in claim 2, wherein the damaged portion and its vicinity are dampened with a spray means.

* * * * *